(12) United States Patent
Chen

(10) Patent No.: US 7,000,660 B2
(45) Date of Patent: Feb. 21, 2006

(54) DUST COVER FOR A COMPUTER KEYBOARD

(76) Inventor: Yu-Pao Chen, 4F, No. 3, Lane 4, Ru-Yi St., Hsintien City, Taipei Hsien (TW)

( * ) Notice: Subject to any disclaimer, the term of this patent is extended or adjusted under 35 U.S.C. 154(b) by 0 days.

(21) Appl. No.: 10/373,688

(22) Filed: Feb. 27, 2003

(65) Prior Publication Data

US 2004/0168754 A1   Sep. 2, 2004

(51) Int. Cl.
*B65D 65/02* (2006.01)
*B65D 85/00* (2006.01)

(52) U.S. Cl. ............... 150/165; 150/154; 400/713; 400/714; 312/208.3

(58) Field of Classification Search ........... 150/154, 150/165, 166, 156, 158, 164, 168; D14/440; 108/90; 312/208.3; 499/713, 714; 296/136.01; 400/713, 714; 206/320
See application file for complete search history.

(56) References Cited

U.S. PATENT DOCUMENTS

| | | | | |
|---|---|---|---|---|
| 1,736,383 A | * | 11/1929 | Waggoner | 150/154 |
| 2,492,262 A | * | 12/1949 | Boyden et al. | 235/61 R |
| 2,801,667 A | * | 8/1957 | Curran | 150/166 |
| 2,950,749 A | * | 8/1960 | MacDonald | 150/166 |
| 3,295,577 A | * | 1/1967 | Danielson | 108/90 |
| 4,889,171 A | * | 12/1989 | Minimo | 150/166 |
| 4,922,980 A | * | 5/1990 | Parker | 150/165 |
| 5,029,933 A | * | 7/1991 | Gillem | 296/136.11 |
| 5,080,155 A | * | 1/1992 | Crozier | 150/154 |
| D353,369 S | * | 12/1994 | Leibengood | D14/455 |
| 5,497,819 A | * | 3/1996 | Chiang | 150/166 |
| 5,551,497 A | * | 9/1996 | Stanley | 150/154 |
| 5,600,090 A | * | 2/1997 | Morris | 174/17 VA |
| 5,697,416 A | * | 12/1997 | Bock et al. | 150/168 |
| 5,772,293 A | * | 6/1998 | Hughes | 312/208.3 |
| 5,922,437 A | * | 7/1999 | Bryant | 428/102 |
| 6,155,280 A | * | 12/2000 | Powell et al. | 135/124 |
| 6,385,299 B1 | * | 5/2002 | Brooks et al. | 379/9 |
| 2001/0041088 A1 | * | 11/2001 | Lebeau et al. | |
| 2003/0002910 A1 | * | 1/2003 | Jeffries et al. | |

FOREIGN PATENT DOCUMENTS

| | | | |
|---|---|---|---|
| DE | 29814839 U1 | * | 11/1998 |
| GB | 2167719 A | * | 6/1986 |
| WO | WO94/00809 | * | 1/1994 |

* cited by examiner

*Primary Examiner*—Sue A. Weaver
(74) *Attorney, Agent, or Firm*—Bacon & Thomas

(57) ABSTRACT

A dust cover for a computer keyboard has a rectangular plastic body and two cords. The dust cover can fit any computer keyboard and provide a convenient and reliable way to press keys on the keyboard while simultaneously protecting the keyboard from pathogens and other contaminants.

2 Claims, 6 Drawing Sheets

DUST COVER FOR A COMPUTER KEYBOARD

BACKGROUND OF THE INVENTION

1. Field of the Invention

The present invention relates to a dust cover for a keyboard, and more particularly to a cover that can protect a keyboard from dust and other contaminants.

2. Description of Related Art

Computers have become so popular in virtually every occupation and home that they have become essential tools in everyday life. Keyboards are connected to computers to input data and commands to the computers, so computers can deal with a lot of information. When keyboards are exposed to the air, dust and other things in the environment easily accumulate on and in the keyboards or between keys on the keyboards, which cause the keyboard to malfunction so data and commands cannot be input to the computer through the keyboards.

In hospitals, clinics and other medical facilities, keyboards may be contaminated by pathogens or other contaminants. Contaminated keyboards may carry a lot of pathogens or contaminants and contaminate a user's fingers so the pathogen or other contaminant will be spread.

With the reference to FIGS. 5 and 6, conventional dust covers have a plastic body (40) and are made from a sheet of plastic larger than a keyboard (50). The plastic body (40) has an edge and a circular opening (not numbered). The circular opening is formed by mounting an elastic cord (41) around the edge of the plastic body (40). To use the conventional dust cover, the plastic body (40) is placed around the keyboard (50), and the elastic cord (41) is pulled tight to hold the dust cover tightly around the keyboard. With the dust cover on the keyboard and the elastic cord (41) pulled tight, the opening will be small and face the bottom surface of the keyboard (50) to protect the keys on the keyboard (50) from dust and pathogens.

To use conventional dust covers, the dust cover is installed on the keyboard (50) and users press keys directly through the dust cover. Because of the size of the keyboard (50), the plastic body (40) fits loosely on the keyboard (50), and because of the loose fitting plastic body (40), the wrong keys may be inadvertently pressed.

To overcome the shortcomings, the present invention provides a dust cover for a keyboard to mitigate or obviate the aforementioned problems.

SUMMARY OF THE INVENTION

The primary objective of the present invention is to provide a dust cover that will fit well on any size keyboards. The dust cover in accordance with the present invention fits the keyboard better, is less likely to interfere with the keyboard or cause erroneous keystrokes and protects the keyboard keys from pathogens and other contaminants.

Other objects, advantages and novel features of the invention will become more apparent from the following detailed description when taken in conjunction with the accompanying drawings.

DETAILED DESCRIPTION OF THE PREFERRED EMBODIMENT

Figure 1:
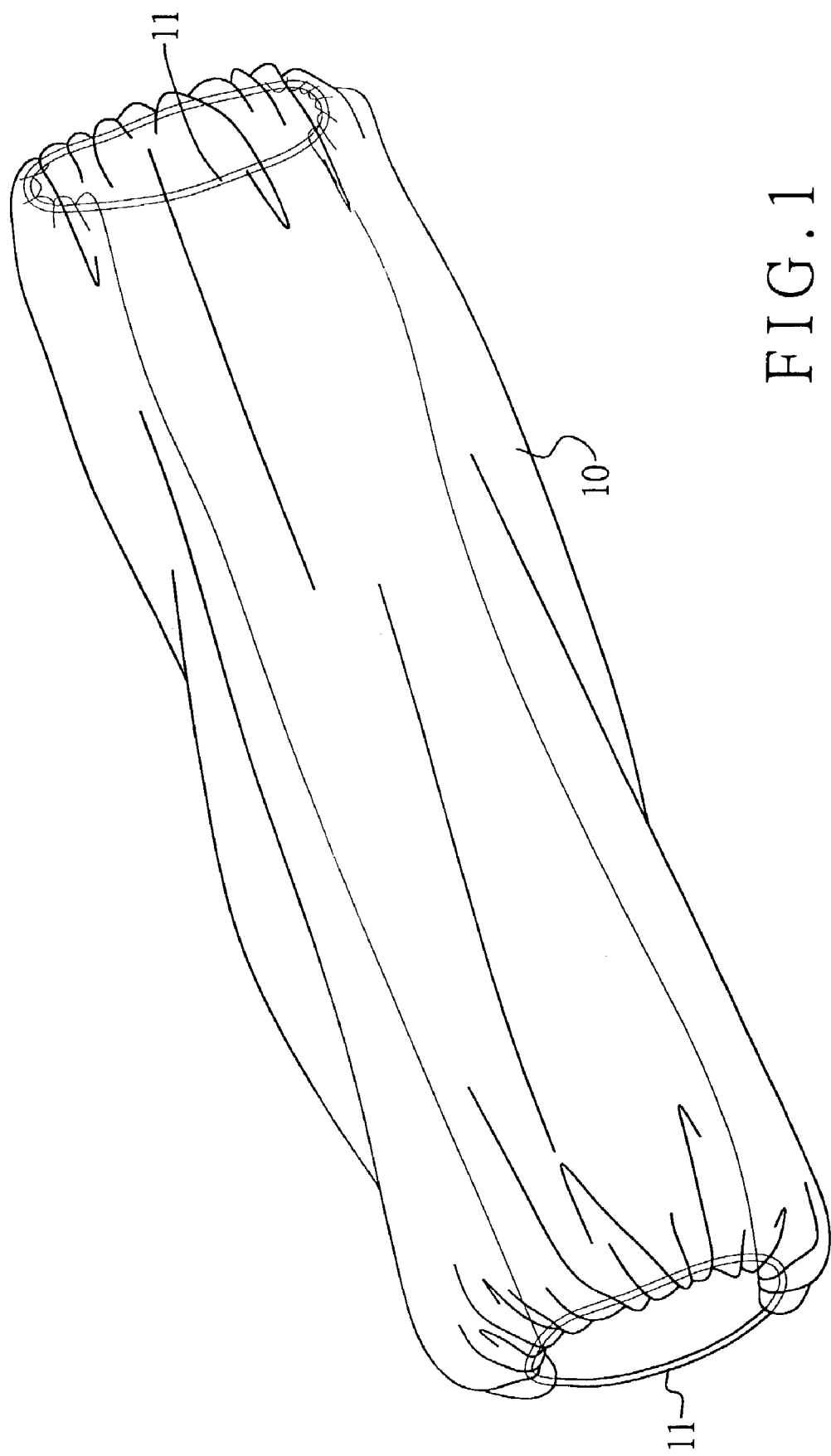
FIG. 1 is a perspective view of a dust cover for a keyboard in accordance with the present invention.
Figure 2:
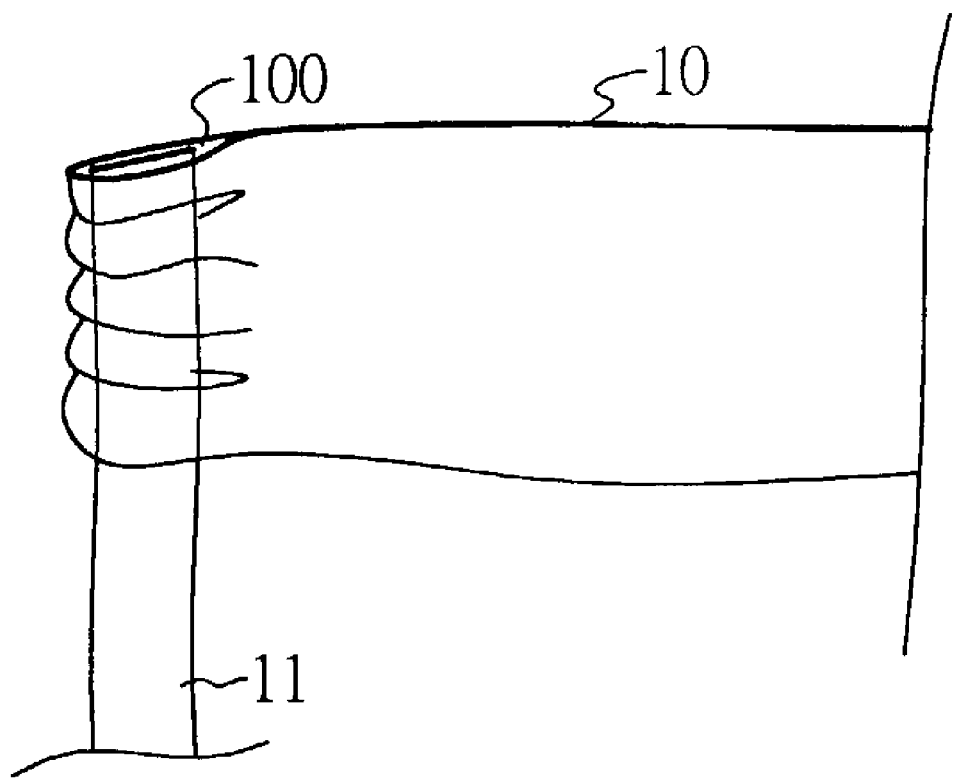
FIG. 2 is an enlarged perspective view of an edge of the dust cover in FIG. 1.
Figure 3:
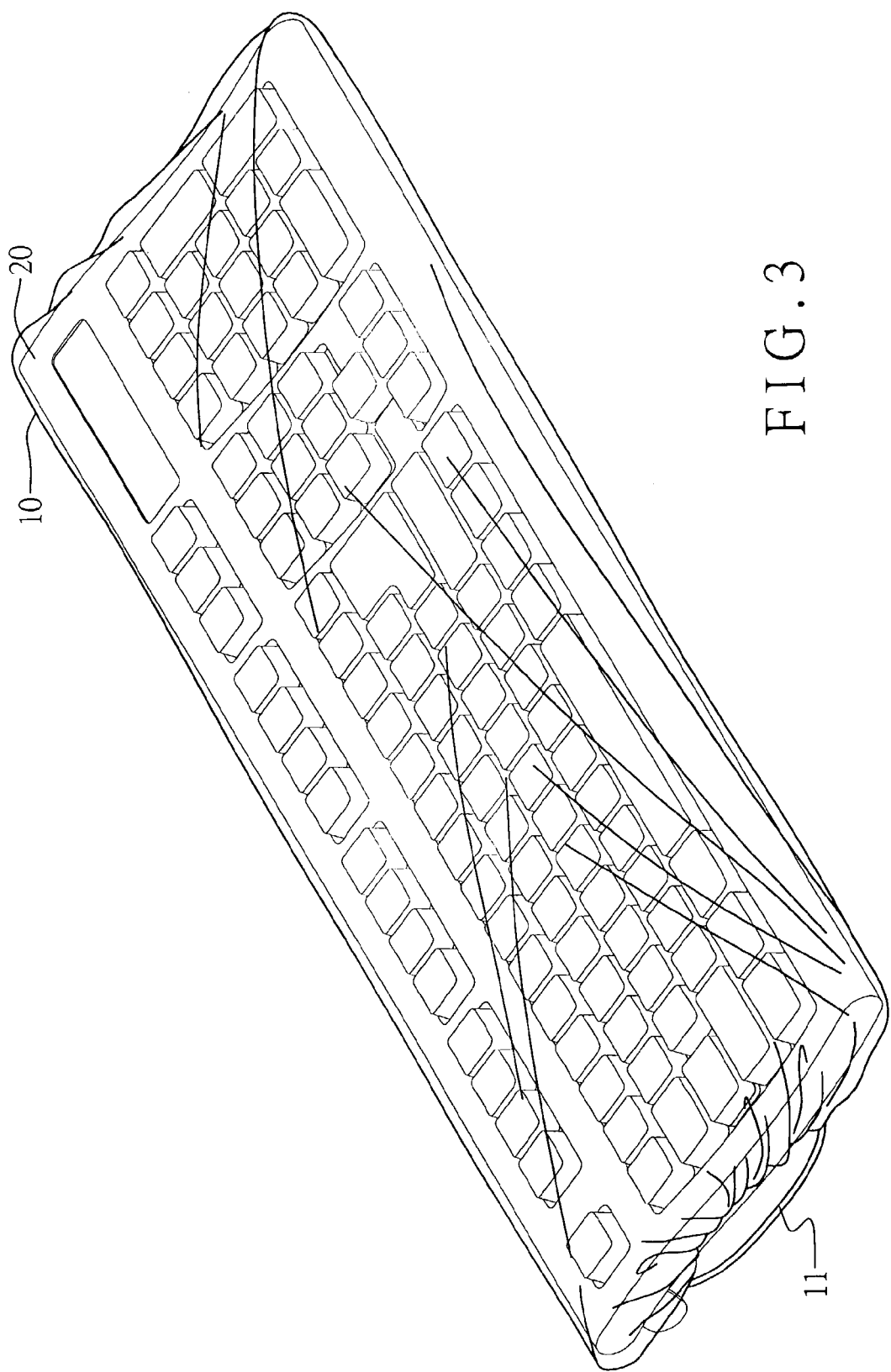
FIG. 3 is an operational perspective view of a keyboard with the dust cover in FIG. 1.

With reference to FIGS. 1 to 3, a dust cover for a computer keyboard in accordance with the present invention has a plastic body (10) and two cords (11).

The plastic body (10) is rectangular and has two long edges (not numbered), two short edges (not numbered) and a total area. The total area of the plastic body (10) is larger than the keyboard (20). Two hems (100) are respectively defined along each short side of the plastic body (10). The cords (11) are passed through the hems (100) respectively. The cords (11) can be strings or elastic cords. Where the cords (11) are elastic cords, the elastic cords form a closed loop.

Figure 4:
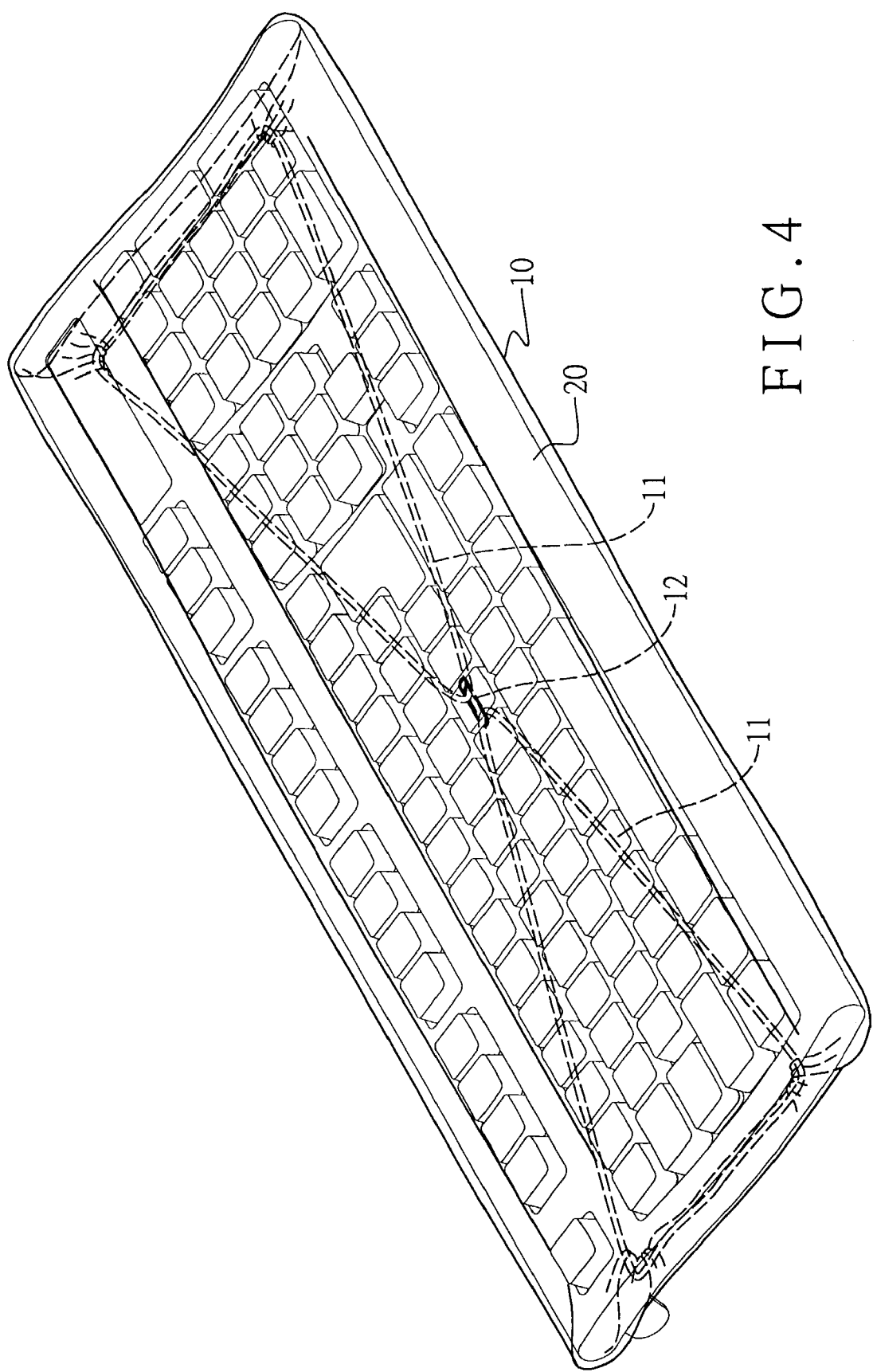
FIG. 4 is a perspective view of a keyboard with the dust cover in FIG. 1 held in place with a hook.
Figure 5:
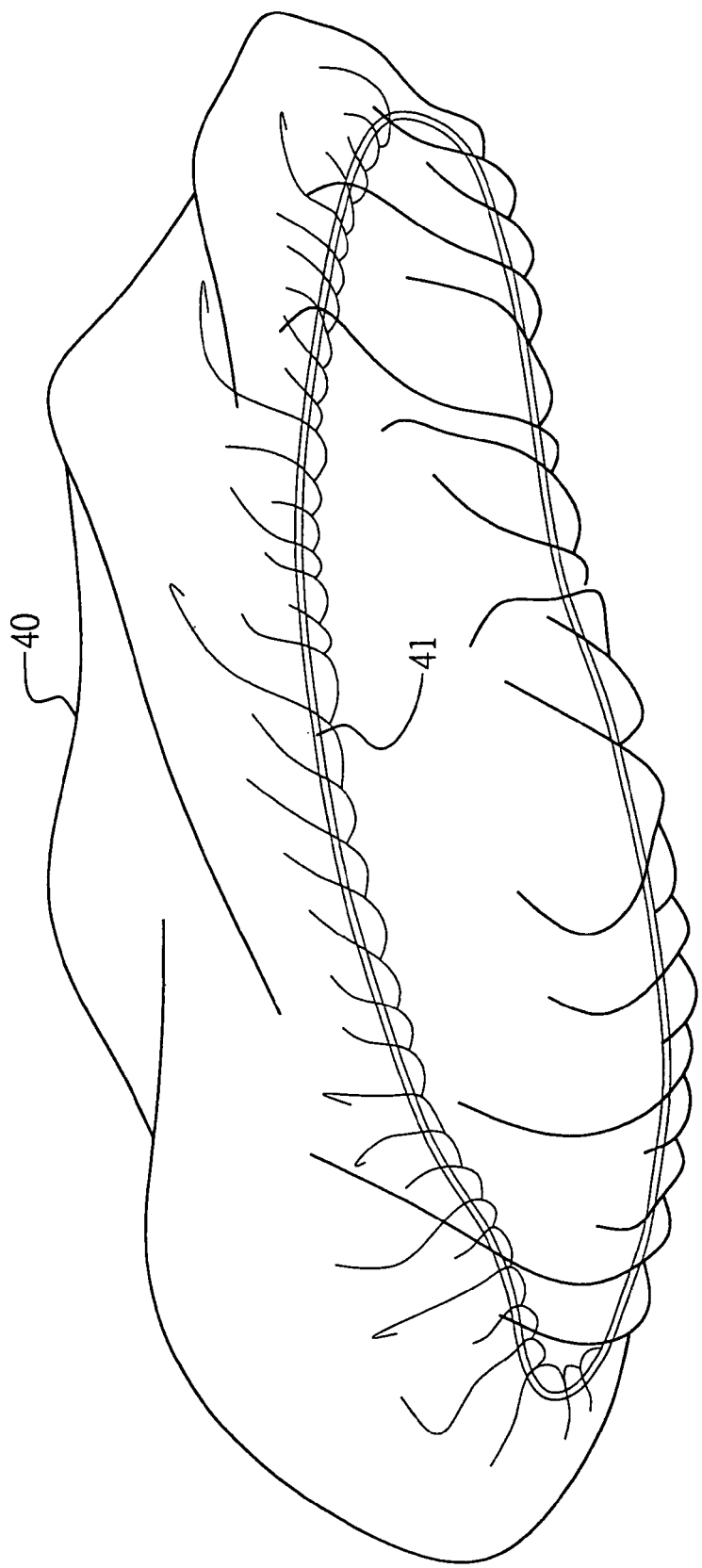
FIG. 5 is a perspective view of a conventional dust cover for a keyboard in accordance with the prior art.
Figure 6:
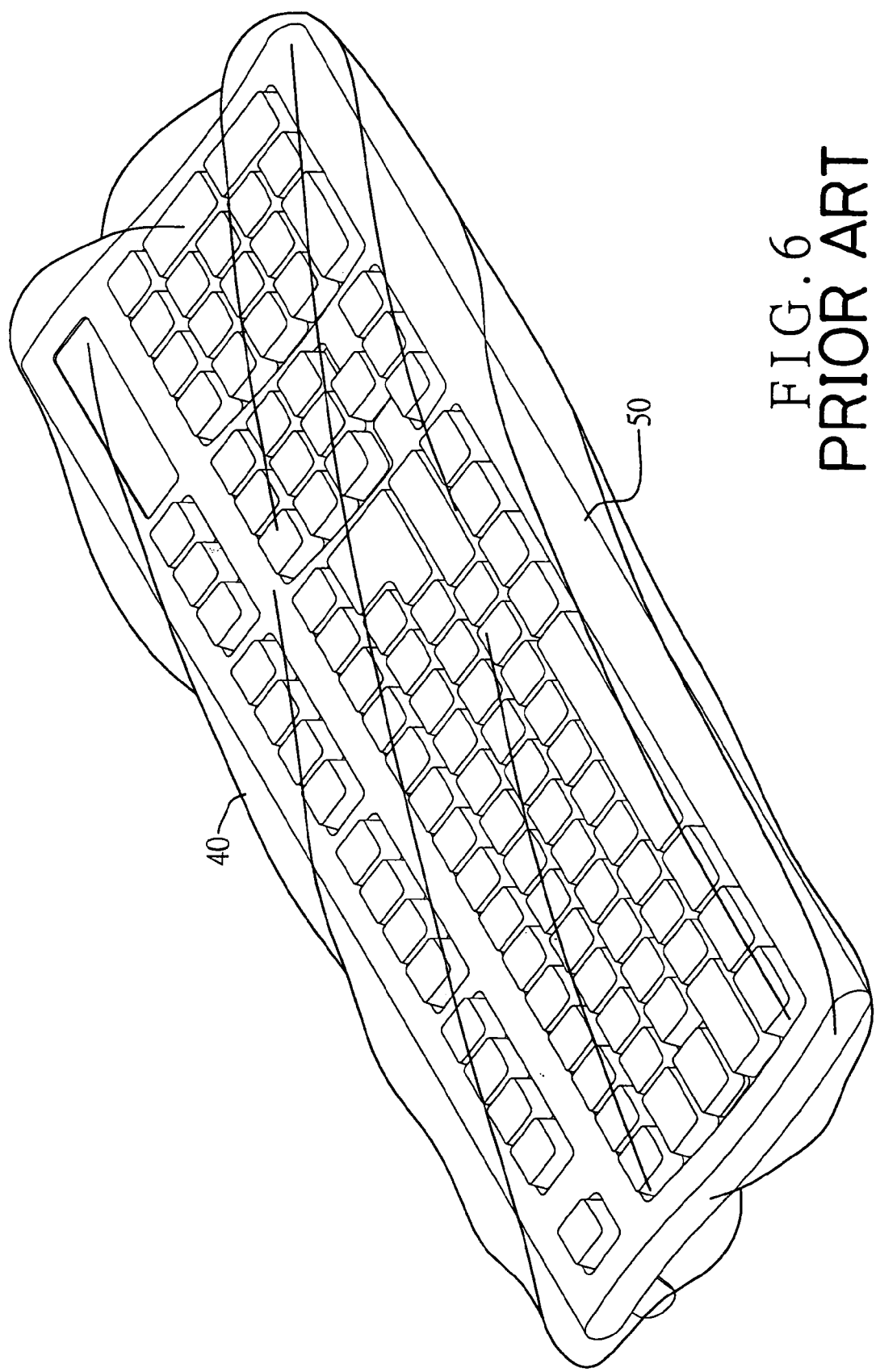
FIG. 6 is an operational perspective view of a keyboard with the conventional dust cover in FIG. 5.

With the reference to FIGS. 3 and 4, when in using the dust cover in accordance of the present invention, the plastic body (10) wraps partially around the keyboard (20), and the cords (11) extending through each hem (100) pull the plastic body (10) tight around the keyboard (20). When a keyboard (20) is covered by the dust cover in accordance with the present invention, users can also pull the cord (11) toward the center of the keyboard (20) and hook the cords (11) on opposite sides together by a hook (12), such as a paper clip. The hook (12) is behind the keyboard (20). Because of a force either inherent in or applied to the cord (11), the plastic body (10) is pulled flat and fits the keyboard (20).

Accordingly, the dust cover in accordance with the present invention provides a convenient and reliable way to press keys on a keyboard (20) while simultaneously protecting the keyboard (20) from pathogens and other contaminants. When the dust cover is used on a smaller keyboard, the dust cover can be made to fit the smaller keyboard by using a hook (12) between the cords (11). Carrying and changing the dust cover thereby preventing pathogens from spreading is also convenient for people who work in hospitals.

Even though numerous characteristics and advantages of the present invention have been set forth in the foregoing description, together with details of the structure and function of the invention, that the disclosure is illustrative only, and changes may be made in detail, especially in matters of shape, size, and arrangement of parts within the principles of the invention to the full extent indicated by the broad general meaning of the terms in which the appended claims are expressed is to be understood.

What is claimed is:

1. A dust cover for a computer keyboard, comprising:
   a plastic body and two cords; said plastic body being rectangular and comprising:
      two long edges;
      two short edges; and
      two hems respectively defined along said short edges, said two cords are elastic closed loops extending respectively through said hems and looping around a semi-circular end of a hook,
   whereby the computer keyboard is protected from contamination.

2. A dust cover for a computer keyboard, comprising:
a plastic body and two cords; said plastic body being rectangular and comprising:
  two long edges;
  two short edges; and
  two hems respectively defined along said short edges, said two cords are elastic closed loops extending respectively through said hems and looping around a semi-circular end of a hook, whereby the computer is protected from contamination and said hook is a paper clip.

* * * * *